United States Patent
Reams et al.

(10) Patent No.: US 10,562,630 B2
(45) Date of Patent: Feb. 18, 2020

(54) AIRCRAFT WITH PARTITION SYSTEM

(71) Applicant: C&D ZODIAC, INC., Huntington Beach, CA (US)

(72) Inventors: Edward Reams, Huntington Beach, CA (US); Tom Eaton, Huntington Beach, CA (US); Stephen Kearsey, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 505 days.

(21) Appl. No.: 15/344,360

(22) Filed: Nov. 4, 2016

(65) Prior Publication Data
US 2017/0129608 A1    May 11, 2017

Related U.S. Application Data

(60) Provisional application No. 62/251,602, filed on Nov. 5, 2015, provisional application No. 62/413,230, filed on Oct. 26, 2016.

(51) Int. Cl.
*B64D 11/00* (2006.01)
*B64D 11/06* (2006.01)

(52) U.S. Cl.
CPC ...... *B64D 11/0023* (2013.01); *B64D 11/0624* (2014.12); *B64D 11/0638* (2014.12); *B64D 2011/0038* (2013.01); *B64D 2011/0053* (2013.01)

(58) Field of Classification Search
CPC ............ B64D 11/0023; B64D 11/0624; B64D 11/0638
See application file for complete search history.

(56) References Cited

U.S. PATENT DOCUMENTS

| | | | | |
|---|---|---|---|---|
| 2,294,295 A | * | 8/1942 | Hankins | B61D 25/00 160/26 |
| 2,605,064 A | * | 7/1952 | Davis | B64D 9/00 105/345 |
| 2,658,759 A | * | 11/1953 | Flory | F41J 9/02 124/32 |
| 2,710,731 A | * | 6/1955 | Bright | B64D 11/0023 105/323 |
| 4,088,322 A | * | 5/1978 | Nikoden, Jr. | F41J 7/00 273/406 |
| 4,102,381 A | * | 7/1978 | Bratschi | E06B 9/36 160/168.1 R |

(Continued)

FOREIGN PATENT DOCUMENTS

| | | | |
|---|---|---|---|
| RU | 2492113 | * | 4/2012 |
| RU | 2492113 C1 | | 9/2013 |
| WO | 2013067021 | | 5/2013 |

OTHER PUBLICATIONS

PCT/US2012/062815 International Search Report & Written Opinion dated Feb. 21, 2013.

(Continued)

*Primary Examiner* — Justin M Benedik
(74) *Attorney, Agent, or Firm* — Jeffer Mangels Butler & Mitchell LLP; Brennan C. Swain, Esq.

(57) ABSTRACT

An aircraft partition system that includes a first partition assembly having an attachment assembly configured to be secured to a first seat track, and a divider wall having first and second opposing sides and extending upwardly from the attachment assembly.

20 Claims, 10 Drawing Sheets

(56) References Cited

U.S. PATENT DOCUMENTS

| | | | |
|---|---|---|---|
| 4,953,611 A | 9/1990 | Verstraten | |
| 5,337,979 A * | 8/1994 | Bales | B64D 11/0696 244/118.1 |
| 6,189,831 B1 * | 2/2001 | Asai | B64D 11/0023 244/118.5 |
| 6,490,829 B1 * | 12/2002 | Schreiner | A47B 21/06 160/196.1 |
| 6,523,779 B1 * | 2/2003 | Michel | B64D 11/0023 244/118.5 |
| 8,556,212 B2 * | 10/2013 | Breuer | B64D 11/00 104/89 |
| 8,684,308 B2 * | 4/2014 | Warner | B64D 11/0023 244/118.5 |
| 8,820,682 B2 * | 9/2014 | Orson | B64D 11/0601 244/118.5 |
| 9,056,681 B2 | 6/2015 | Orson et al. | |
| 2007/0085389 A1 * | 4/2007 | Schurg | B64D 11/06 297/184.1 |
| 2010/0308190 A1 | 12/2010 | Tkocz | |
| 2011/0024061 A1 * | 2/2011 | Bell | E05D 15/0652 160/199 |
| 2012/0112505 A1 * | 5/2012 | Breuer | B64D 11/0023 297/217.1 |
| 2014/0035330 A1 | 2/2014 | Henshaw | |
| 2014/0209742 A1 | 7/2014 | Guering et al. | |

OTHER PUBLICATIONS

Supplemental Search Report issued in European Patent Appln. 168363109.1.

International Search Report and Written Opinion dated Mar. 17, 2017 in PCT/US16/60688.

* cited by examiner

AIRCRAFT WITH PARTITION SYSTEM

This application claims the benefit of U.S. Provisional Application Nos. 62/251,602, filed Nov. 5, 2015, and 62/413,230, filed Oct. 26, 2016, both of which are incorporated by reference herein in their entireties.

FIELD OF THE INVENTION

The present invention relates to an aircraft, and more particularly to an aircraft with a divider wall system.

BACKGROUND OF THE INVENTION

In standard aircraft cabin arrangements, the first class seating (P class) is located at the front of the aircraft. However, alternative arrangements are desirable. The present invention provides the ability to reorient the cabin interior as desired.

SUMMARY OF THE PREFERRED EMBODIMENTS

In accordance with a first aspect of the present invention there is provided an aircraft partition system that includes a first partition assembly having an attachment assembly configured to be secured to a first seat track, and a divider wall having first and second opposing sides and extending upwardly from the attachment assembly. In a preferred embodiment, the attachment assembly includes a first attachment member extending outwardly from the first side of the divider wall and the first attachment member is configured to be secured to a first seat track. The attachment assembly includes a second attachment member extending outwardly from the second side of the divider wall and the second attachment member is configured to be secured to a second seat track. Preferably, the first attachment member includes a flange secured to the first side of the divider wall, an arm extending outwardly from the flange and a seat track fitting extending downwardly from the arm, and the second attachment member includes a flange secured to the second side of the divider wall, an arm extending outwardly from the flange and a seat track fitting extending downwardly from the arm. In a preferred embodiment, the attachment assembly includes a seat track member.

In a preferred embodiment, the aircraft partition system includes a carriage assembly, and the top of the divider wall of the first partition assembly is secured to the carriage assembly. Preferably, the carriage assembly includes a first hook configured to be secured to a first passenger service unit rail and the divider wall of the first partition assembly is movable with respect to the carriage assembly. In a preferred embodiment, the carriage assembly includes a channel defined therein, the divider wall includes a movable member at a top thereof, and the movable member is received in the channel. Preferably, the movable member is a pin extending upwardly from the top of the divider wall.

A preferred embodiment, the carriage assembly includes a second hook configured to be secured to a second passenger service unit rail. In a preferred embodiment the partition system includes a second partition assembly that includes an attachment assembly configured to be secured to the first seat track, and a divider wall extending upwardly from the attachment assembly that includes first and second opposing sides. Preferably, the top of the divider wall of the second partition assembly is also secured to the carriage assembly. Preferably, the partition system also includes at least one electrical conduit member positioned between the divider walls of the first and second partition assemblies. The electrical conduit member can include a light.

In a preferred embodiment, the first side of the divider wall includes at least a first component chosen from an armrest, a literature pocket, a pivotal tray, a cup holder, a reading light, a charging station, a wall pad or a pillow, and the second side of the divider wall includes at least a second component chosen from an armrest, a literature pocket, a pivotal tray, a cup holder, a reading light, a charging station, a wall pad or a pillow. In a preferred embodiment, the first and second components are movable horizontally with respect to the divider wall. Preferably, the first and second components are movable on or with a rail system.

In accordance with another aspect of the present invention there is provided an aircraft partition system that includes a first partition assembly that includes an attachment assembly, and a divider wall having first and second opposing sides and extending upwardly from the attachment assembly. The attachment assembly includes a first attachment member extending outwardly from the first side of the divider wall that is configured to be secured to a first seat track. The partition system also includes a second partition assembly that includes an attachment assembly, and a divider wall having first and second opposing sides and extending upwardly from the attachment assembly. The attachment assembly includes a first attachment member extending outwardly from the first side of the divider wall that is configured to be secured to the first seat track. The partition system also includes a carriage assembly that includes a main body portion. The main body portion includes first and second hooks that are configured to be secured to first and second passenger service unit rails in the aircraft. The top of the divider wall of the first partition assembly is secured to the carriage assembly and the top of the divider wall of the second partition assembly is secured to the carriage assembly. Preferably, the divider walls of the first and second partition assemblies are movable with respect to the carriage assembly.

In accordance with another aspect of the present invention there is provided an aircraft cabin that includes a floor having first and second longitudinally extending seat tracks therein, first and second seats that form a first row, and a partition system that includes a first partition assembly comprising an attachment assembly secured to the first seat track and a divider wall extending upwardly from the attachment assembly. The divider wall extends longitudinally between the first and second seats.

In a preferred embodiment, the partition system includes a carriage assembly, and the top of the divider wall of the first partition assembly is secured to the carriage assembly. The carriage assembly is preferably secured to a first passenger service unit rail and the aircraft.

In accordance with another aspect of the present invention there is provided a method of dividing an aircraft cabin into first and second cabin sections. The aircraft cabin includes a floor having first and second longitudinally extending seat tracks therein, first and second seats that form a first row, and third and fourth seats that form a second row. The method includes obtaining a first partition assembly that includes an attachment assembly and a divider wall extending upwardly from the attachment assembly, securing the attachment assembly of the first partition assembly to the first seat track and positioning the divider wall longitudinally between the first and second seats. In a preferred embodiment the method also includes securing a carriage assembly to a first passenger service unit rail and securing a top of the divider wall of the first partition assembly to the carriage assembly. In a preferred embodiment, the method also includes obtaining a second partition assembly that includes an attachment assembly and a divider wall extending upwardly from the attachment assembly, securing the attachment assembly of the second partition assembly to the first seat track and positioning the divider wall longitudinally between the third and fourth seats, and securing a top of the divider wall of the second partition assembly to the carriage assembly.

The present invention relates to an aircraft that includes a partition or divider wall system. In a preferred embodiment, the divider wall system divides the aircraft into separate sections. For example, the left section (when facing forward to the direction of travel of the aircraft) can be an economy class section and the right section can be a first class or business class section. In another embodiment, the left section can be a business class section and the right section can be a first class section. In another embodiment, the right section can be economy with the left section being either first or business class. In another embodiment, both sides can be the same class of service. In another embodiment, more than one wall can be used (either in line longitudinally or parallel to one another). Other levels of service are also within the scope of the present invention. The title of the type of section is not intended to be limiting. The divider wall(s) or partition can extend from the front to the rear of the entire passenger section of the aircraft or only partially therealong. U.S. Pat. No. 8,820,682, issued on Sep. 2, 2014, is incorporated by reference in its entirety herein. This application is also related to U.S. Provisional Patent Application No. 62/144,757, filed Apr. 8, 2015, the entirety of which is incorporated by reference herein.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
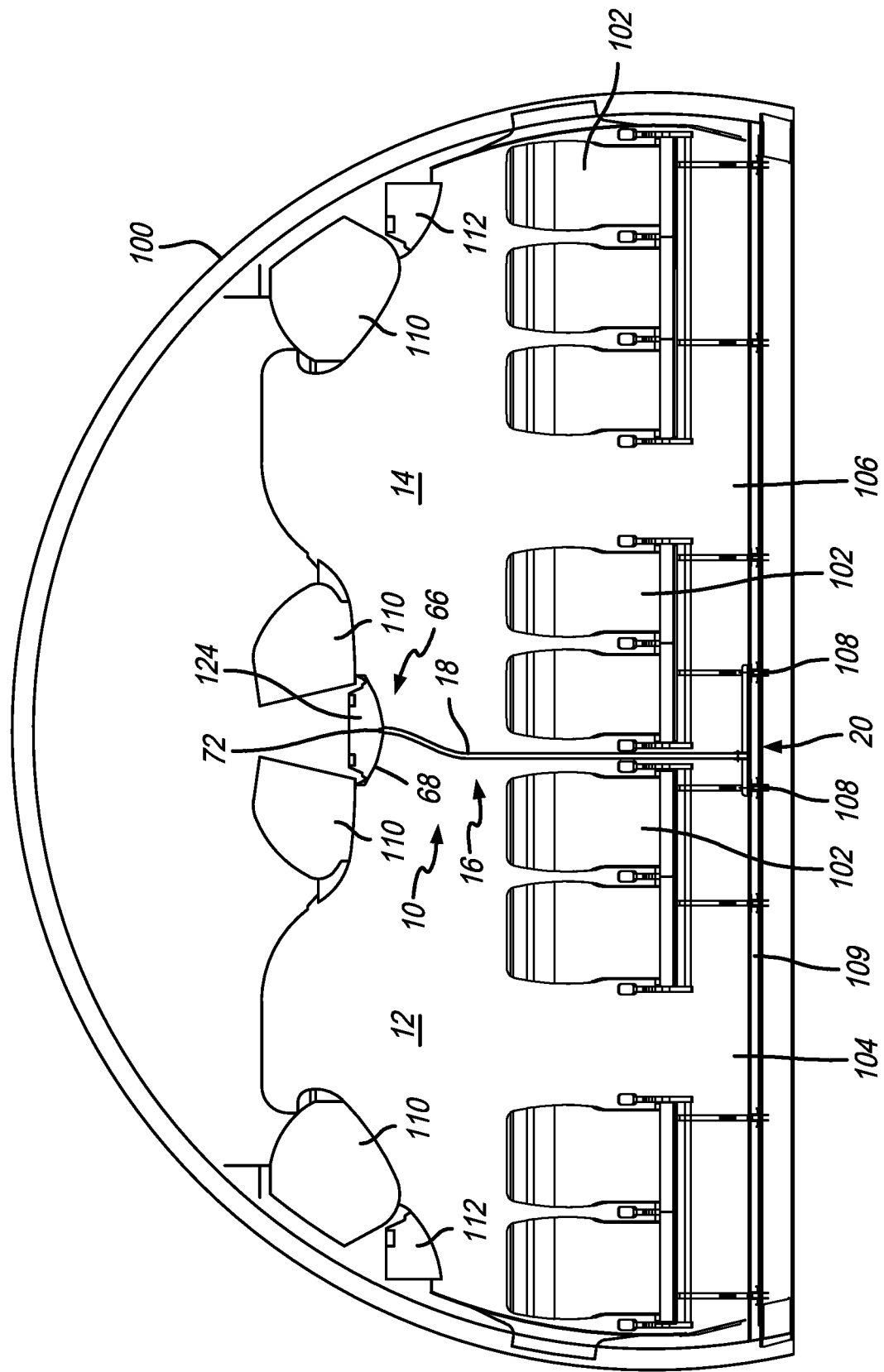
FIG. 1 is an elevational view of an aircraft cabin with a partition system disposed therein in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIG. 1 shows the interior of a wide body aircraft cabin 100 that includes a plurality of rows of seats 102, first and second longitudinally extending aisles 104 and 106 and a partition system 10 dividing the cabin 100 into first and second cabin sections 12 and 14. In a preferred embodiment, the partition system 10 is secured at the bottom thereof to seat tracks 108 in the floor 109 and at the top thereof to the passenger service unit (PSU) rails 111 (see FIG. 7). The partition system 10 can be retrofitted into an aircraft that includes PSU rails 111 and seat tracks 108 therein or can be included in a new aircraft. The partition system 10 can extend the entire length of the aircraft cabin 100 or only a portion of the length thereof. Furthermore, the partition system 10 can be a single partition assembly 16 or may be comprised of a plurality of separate partition assemblies 16 (see FIG. 2).

FIG. 1 is an elevational view of the aircraft cabin 100 that includes typical cabin components such as overhead bins 110 and passenger service units 112. It will be appreciated by those skilled in the art that these components are not a limitation on the present invention and may be different in different aircraft. In some embodiments, the partition system 10 extends from the floor to the ceiling PSU or storage bins thereabove so that there is little to no gap between the top of the partition system 10 and the component thereabove. It will further be understood that as used herein, "ceiling" means the overhead interior surface of the cabin. In other words, when the partition system 10 extends from the floor to the ceiling, as shown in FIG. 1, a passenger in the first cabin section 12 cannot see over the partition and into the second section 14. However, in this embodiment, the "ceiling" is the panels between the overhead bins 110. In other embodiments, the partition system 10 may only extend upwardly from the floor a portion of the distance, thereby providing passengers the ability to see into the adjacent cabin section. It will be appreciated that the first and second cabin sections 12 and 14 can be the same or different classes of service (e.g., first class, business class and/or economy class). It will be appreciated that the partition system 10 shown in FIGS. 1-7 is positioned to provide first and second cabin sections 12 and 14 that are generally the same size and include the same number of seats 102 therein.

As shown in FIGS. 2-5, in a preferred embodiment, the partition system 10 includes a plurality of partition assemblies 16 that are secured to the seat tracks 108. In a preferred embodiment, each partition assembly 16 is associated with a row of seats 102. In another embodiment, each partition assembly 16 may be associated with a plurality of rows of seats 102. In a preferred embodiment, the partition assembly 16 includes a generally vertically oriented divider wall 18 having first and second opposing surfaces or sides 18a and 18b and an attachment assembly 20 connected or secured at or near the bottom of the divider wall 18. The attachment assembly 20 is preferably connected to one or more of the adjacent seat tracks 108. As shown in FIG. 1, the partition assembly 16, and, in particular, the divider wall 18, is positioned between two seats 102 and divides the cabin 100 into the first and second cabin sections 12 and 14.

Figure 2:
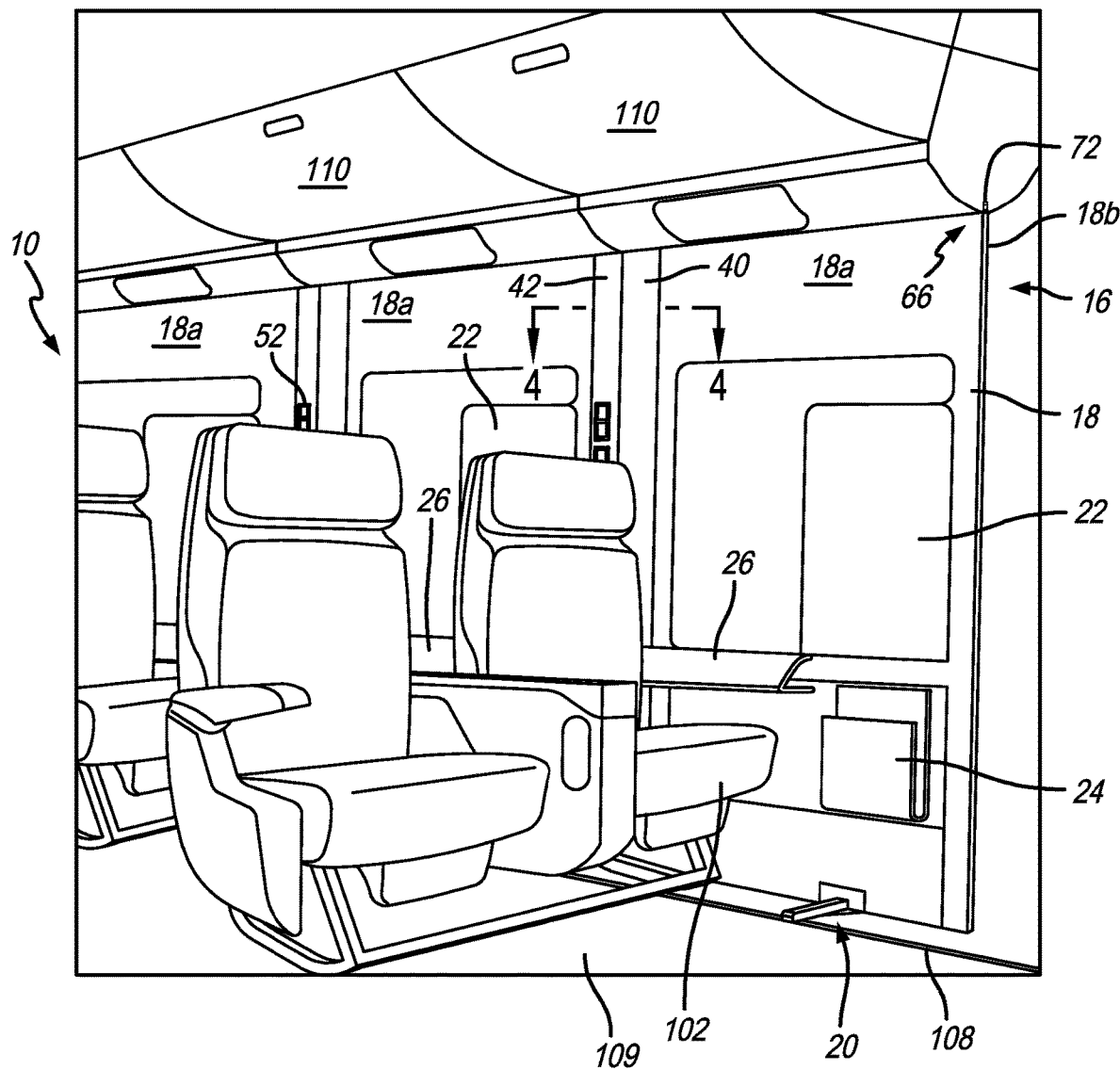
FIG. 2 is a perspective view of an aircraft interior with the partition system of FIG. 1 disposed therein.

In a preferred embodiment, each partition assembly 16 includes components associated with the adjacent seat 102. For example, as shown in FIG. 2, the partition assembly 16 includes a pivotal or fold down table/tray 22 (shown in the stowed position), a literature pocket 24 and an armrest 26 that are each secured to or a part of the divider wall 18. The partition assembly 16 can also include other components, such as a cup holder, a reading light, a charging station, a wall pad or a pillow. It will be appreciated that at least some of the same components are on the opposite side of the wall 18 for the seat 102 on the other side thereof.

Figure 3:
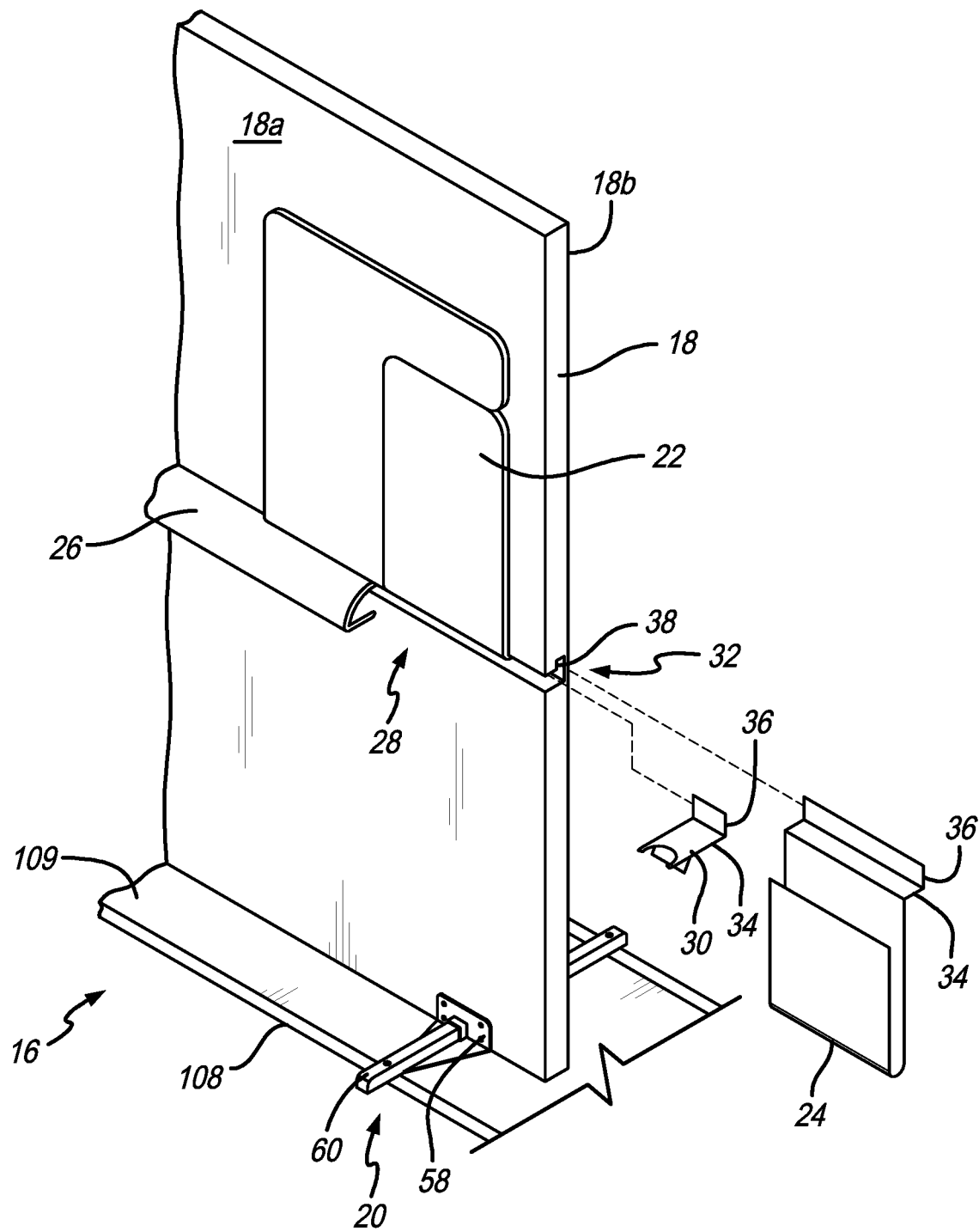
FIG. 3 is a perspective view of a partition assembly including a component rail system.

As shown in FIG. 3, in a preferred embodiment, at least some of the components are secured to the divider wall 18 by a rail system 28. The rail system 28 allows the position of the component to be adjustable longitudinally along the divider wall 18. FIG. 3 shows the tray 22 and armrest 26 connected to the divider wall 18 by the rail system 28 and the literature pocket 24 and a cup holder 30 exploded therefrom. The rail system 28 can include any system that secures the component (e.g., tray, armrest) to the wall 18 and allows the component to slide or move along the wall 18. As shown in the drawings, in a preferred embodiment, the wall 18 includes a channel 32 defined therein that receives a bracket 34 on the component. The bracket 34 includes an upwardly extending flange 36 that is blocked by a downwardly extending flange 38 on the wall 18 to prevent the bracket 34 from coming out of the channel 32. This arrangement allows the component to move longitudinally along the wall. In a preferred embodiment, spacers can be inserted into the channel 32 and between the components to prevent the component from moving longitudinally along the channel 32 after it has been placed in the desired position. This, of course, would be done during arrangement of the seats, prior to the aircraft flying with passengers.

Figure 4:
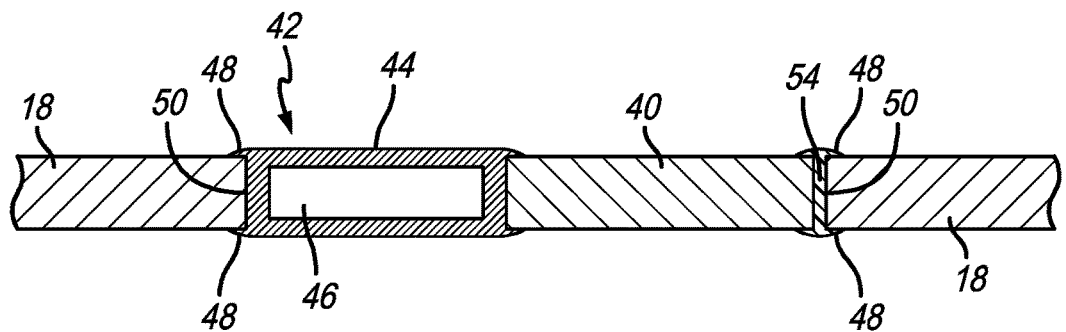
FIG. 4 is a cross-sectional view taken along line 4-4 of FIG. 2.

With reference to FIGS. 2 and 4, in a preferred embodiment, the partition system 10 includes filler panels 40 and electrical conduit members 42. The filler panels 40 can be positioned between adjacent divider walls 18 when needed to fill or closeout space therebetween and for allowing different seat pitches. In other words, if the cabin is rearranged and the seats 102 and walls 18 are moved further apart, a filler panel 40 can be inserted therebetween. Any dimension filler panel 40 is within the scope of the present invention. The electrical conduit members 42 can be provided to allow electrical wiring to extend therethrough between the floor and the ceiling. This allows for electrically controlled features like reading lights, a valence lights, personal service unit controls and other components using electricity to move with the seat 102 and the wall 18.

As shown in FIG. 4, in a preferred embodiment, the electrical conduit member 42 includes a main body portion 44, a tunnel 46 extending therethrough, and receiver members 48 that define a channel 50 for receiving the edge of a divider wall 18 or the edge of a filler panel 40. The electrical conduit member 42 can also include lights 52 thereon (see FIG. 2). As shown in FIG. 4, a connector member 54 (including receiver members 48 that define a channel 50) can be provided to secure a filler panel 40 to a divider wall 18. It will be appreciated that the connector member 54 is essentially an electrical conduit member 42 without the tunnel extending therethrough.

Figure 5:
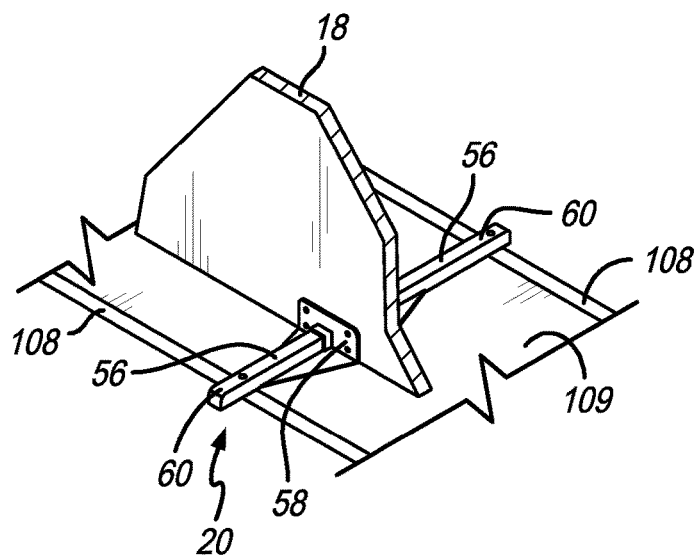
FIG. 5 is a perspective view of a portion of the partition assembly showing an attachment assembly for securing the partition assembly to the floor.
Figure 6:
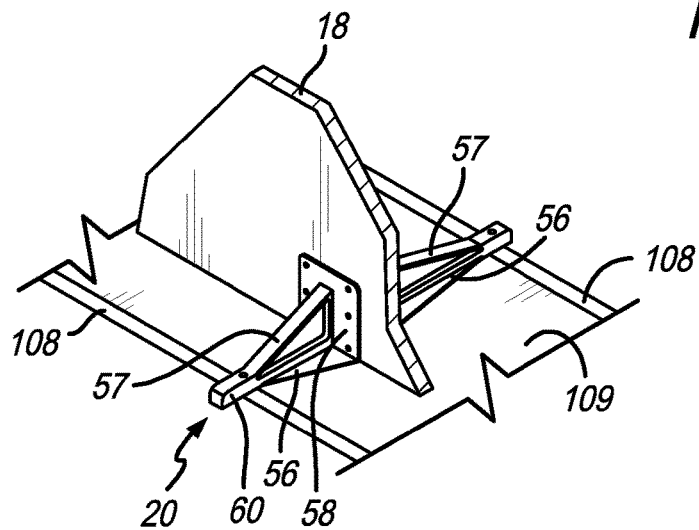
FIG. 6 is a perspective view of a portion of the partition assembly showing another attachment assembly for securing the partition assembly to the floor.

As discussed above, the attachment assembly 20 can be any component or system that secures the divider wall 18 to the floor 109 and preferably the seat tracks 108. FIGS. 5-6 show different attachment assemblies 20 that are within the scope of the present invention. The attachment assembly 20 shown in FIG. 5 includes first and second attachment members 56 extending outwardly or transversely from the first and second sides 18a and 18b of the wall 18. Each attachment member 56 includes a flange 58 that is attached to the wall 18 and an arm 60 extending outwardly from the flange 58. The bottom of the arm 60 includes a seat track attachment or seat track fitting 61 for securing the arm 60 to the seat track 108. Seat track fittings are known in the art and are therefore not described herein. The attachment assembly 20 shown in FIG. 6 is similar to the attachment assembly 20 shown in FIG. 5, however, each attachment member 56 also includes a gusset 57. In a preferred embodiment, the first and second attachment members 56 can be staggered longitudinally along the wall 18. An attachment assembly 20 can include a single attachment member 56 or multiple attachment members 56. In another embodiment, the entire attachment assembly 20 can be a unitary piece that connects to the bottom of wall 18.

Figure 7:
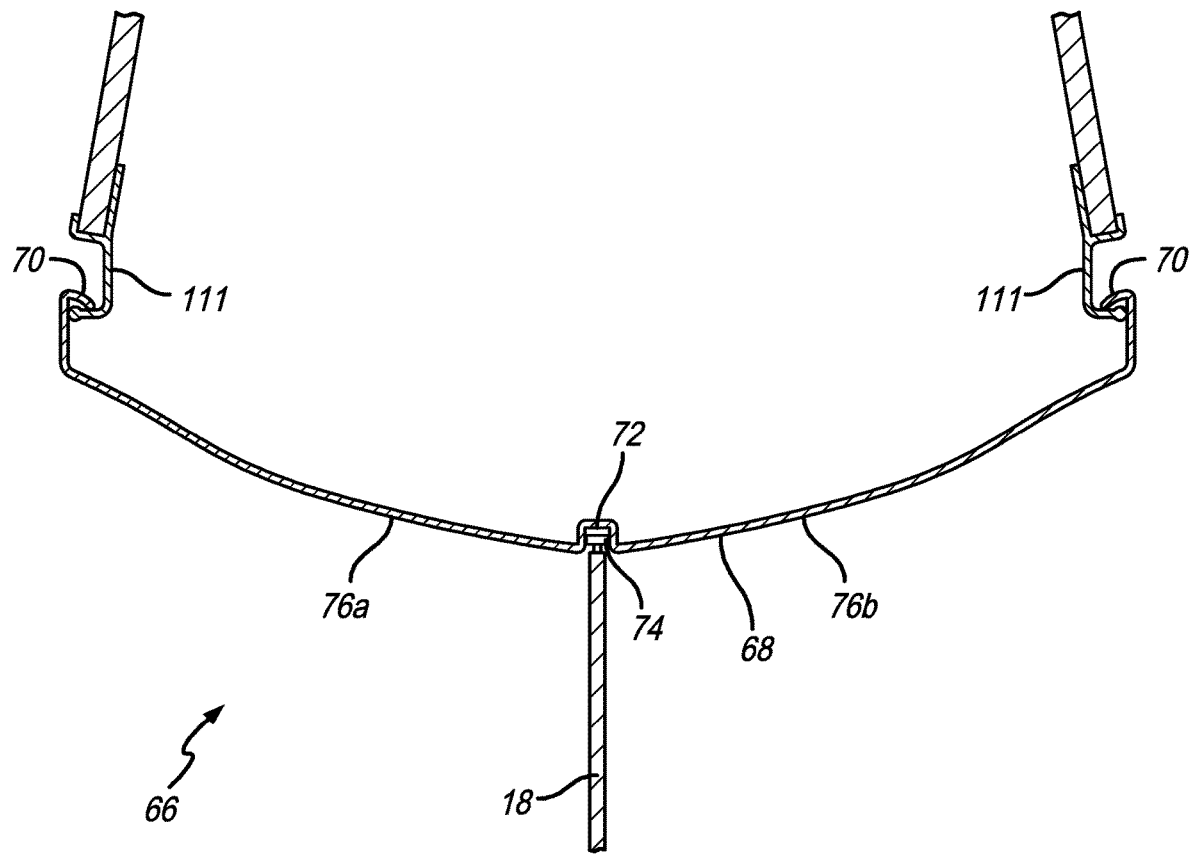
FIG. 7 is a cross-sectional view of a divider wall operatively connected to a carriage assembly that connects with the PSU rails.

FIG. 7 shows an exemplary embodiment of a carriage assembly 66 for securing the top of the divider wall 18. In a preferred embodiment, the carriage assembly 66 is secured to the existing PSU rails 111 in the aircraft. However, in another embodiment, the carriage assembly 66 can be secured to other components in the aircraft. As is known in the art, often, the PSU rails are located in a PSU channel 124 that is defined in or part of the overhead storage bins 110 (see FIG. 1). Preferably, the carriage assembly 66 includes a main body portion 68 having attachment members or hooks 70 that are secured to the PSU rails 111. The main body portion 68 also includes a channel 72 defined therein that captures or receives a movable member 74 (or a plurality of movable members 74) extending upwardly from the divider wall 18.

In a preferred embodiment, as shown in FIG. 7, the movable member 74 is a pin. However, the movable member 74 can be any component or shape that is captured in channel 72 and allows the wall 18 and movable member 74 to move therealong, e.g., a wheel, a post or simply the top of the wall (i.e., the top of the wall can be considered the movable member). Furthermore, channel 72 is shown as U-shaped. However, in another embodiment, it can be T-shaped. It will be appreciated by those of ordinary skill in the art that the retention of the movable member 74 in the channel 72 allows the partition assembly 16 and wall 18 to translate or slide longitudinally and allows the wall to rotate about the longitudinal x-axis. This provides clearance or "give" as the wall 18 flexes during flight. Furthermore, the wall 18 is constrained from moving up and down in the y-axis direction. Lastly, due to the pin 74 being received in the channel 72, the wall 18 is allowed to move slightly transversely in the z-axis direction, once again providing clearance or "give" as the wall 18 flexes during flight. It will be appreciated that the sides 76a and 76b of the main body portion 68 can be the same shape (symmetrical in cross-section, as shown in FIG. 7) or different shapes. The sides 76a and 76b may be different shapes if, for example, side 76a is part of and visible within a business class section and side 76b is part of an visible within an economy class section (see the exemplary embodiment below).

In a preferred embodiment, the carriage assembly 66 extends the entire longitudinal length of the partition system 10. This allows separate partition assemblies 16 to be moved along the carriage assembly 66 when configuring the interior of a cabin and pitching the seats. In another embodiment, each partition assembly 16 can include a separate carriage assembly 66 and longitudinal movement can be provided by moving the carriage assembly 66 along the PSU rails. In an embodiment, the movable member 74 can be omitted and the divider wall 18 can be secured directly to or be unitary with the carriage assembly 66. In another embodiment, the wall 18 can be secured directly to the ceiling.

FIGS. 8-11 show a partition system 10 that is positioned to provide first and second cabin sections 12 and 14 that are different sizes and include a different number of seats therein (e.g., three seats in the first cabin section 12 and six seats in the second cabin section 14). In the exemplary scenario shown in the drawings, first cabin section 12 is a business class section with seats 120 and second cabin section 14 is in economy class section with seats 102.

Figure 8:
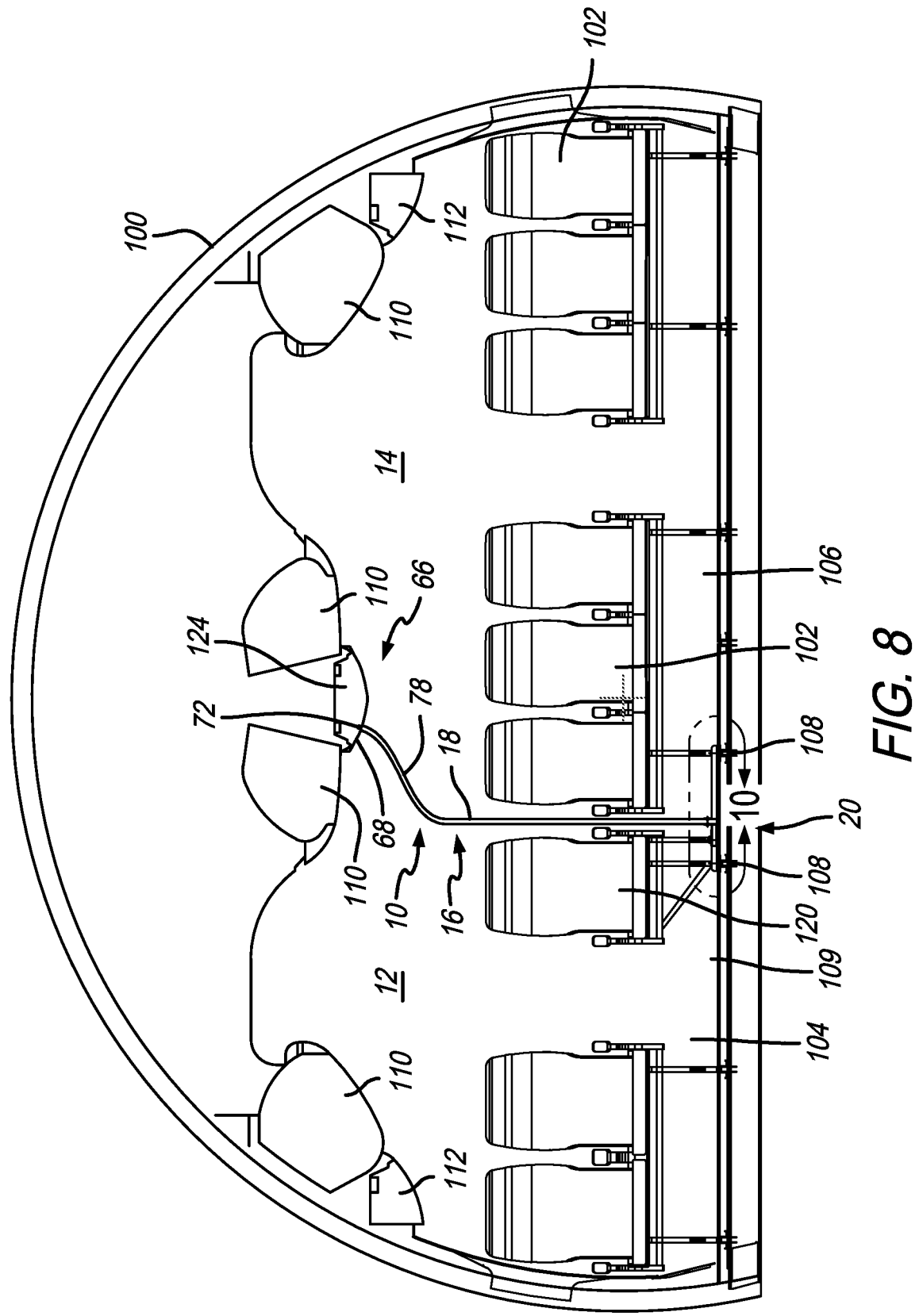
FIG. 8 is an elevational view of an aircraft cabin with a partition system disposed therein in accordance with another preferred embodiment of the present invention.

As shown in FIG. 8, and as discussed above, the carriage assembly 66 includes sides 76a and 76b with different shapes or sizes. Also, the divider wall 18 is not vertical at the top, but instead includes a top portion 78 that is curved. In another embodiment, the top portion 78 can be straight and angled from the rest of the divider wall. It should be understood that this shape of divider wall 18 is still considered generally vertically extending because it generally extends from the floor vertically upward to the ceiling.

Figure 9:
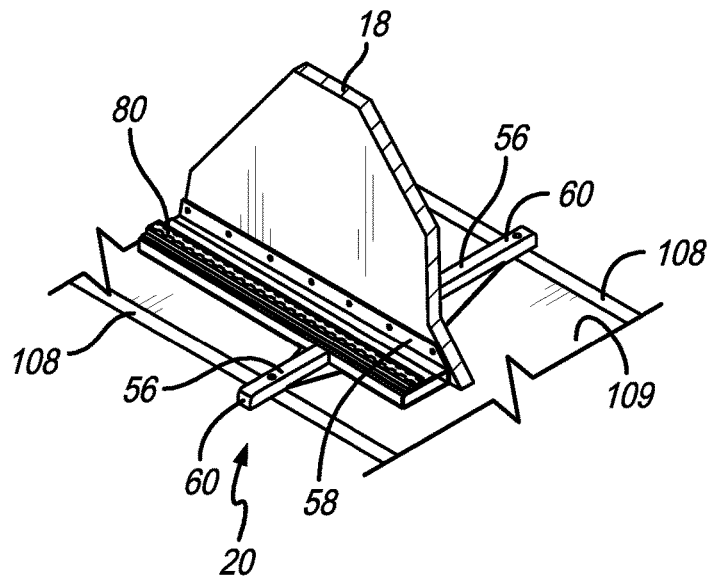
FIG. 9 is a perspective view of a portion of the partition assembly showing an attachment assembly for securing the partition assembly to the floor.
Figure 10:
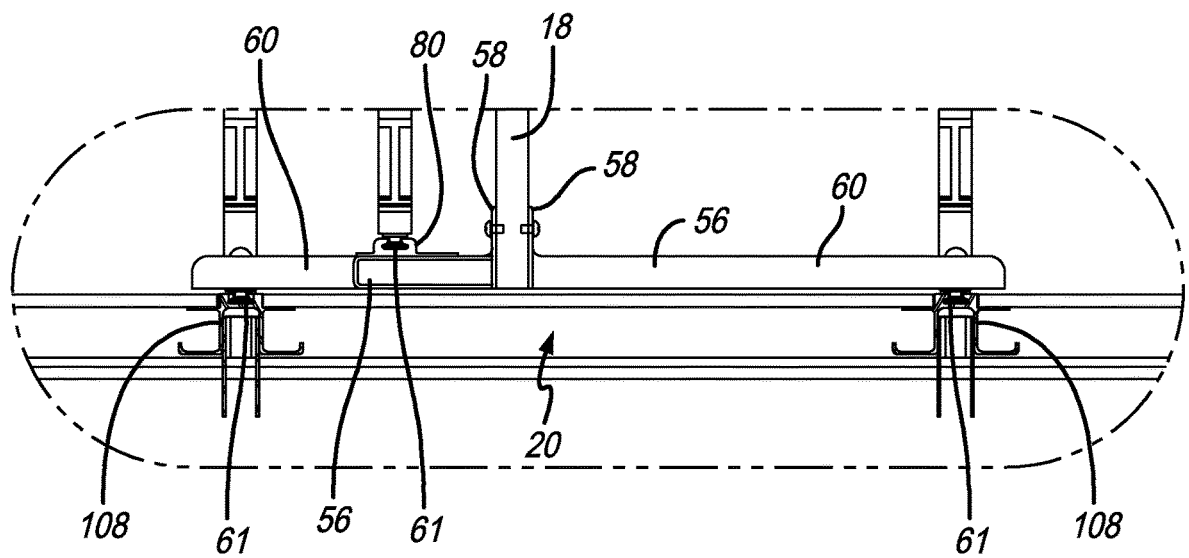
FIG. 10 is a close up taken from a section of FIG. 8.
Figure 11:
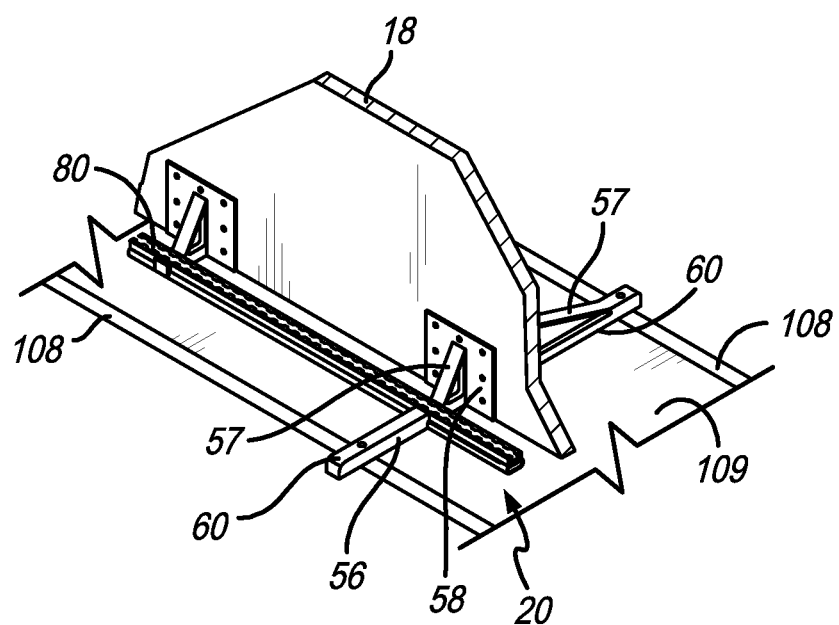
FIG. 11 is a perspective view of a portion of the partition assembly showing another attachment assembly for securing the partition assembly to the floor.

Because the partition system 10 does not extend down the center of the cabin 100, or due to the lateral positioning of the wall 18 seat tracks 108 may not be readily available on both sides thereof or seats may have to be moved laterally so that both legs thereof do not directly lineup with the seat tracks 108. Therefore, as shown in FIGS. 8-11, the attachment assembly 20 may include a seat track member 80 associated therewith or incorporated therein that includes a seat track (similar to those in the aircraft floor) for securing a seat 102 or 120 thereto. As shown in FIGS. 9-10, the seat track member 80 can be attached to the flange 58 that is attached to the wall 18. In this embodiment, the arm 60 extends outwardly from the seat track member 80. In another embodiment, as shown in FIG. 11, the seat track member 80 can extend between separate attachment members 56. Also, the seat 120 can include an angled leg or structural member that angles downwardly and over to the seat track member 80.

Figure 12:
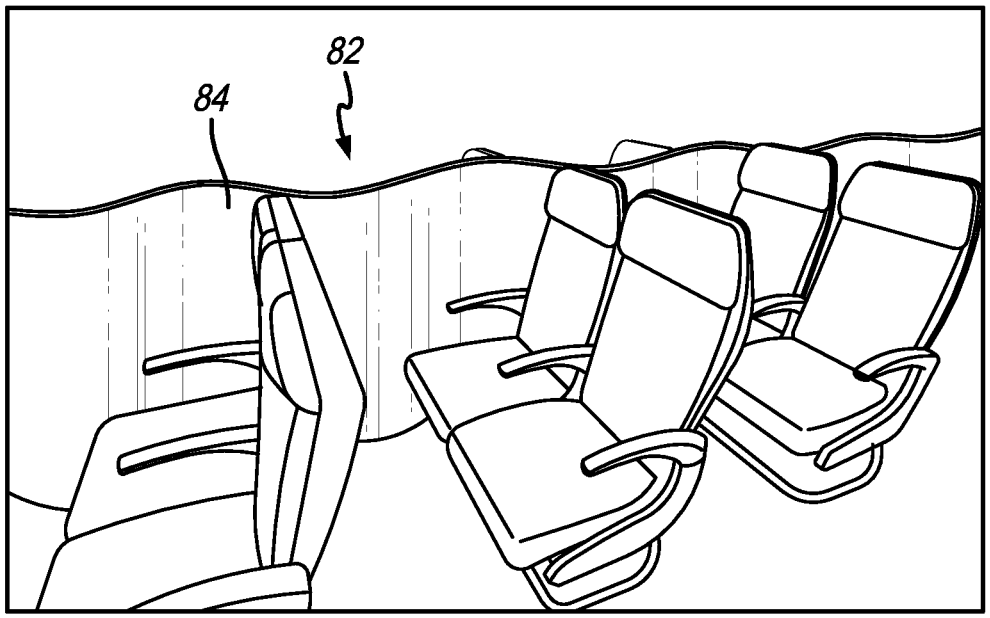
FIG. 12 is a perspective view of an embodiment of the partition system.
Figure 13:
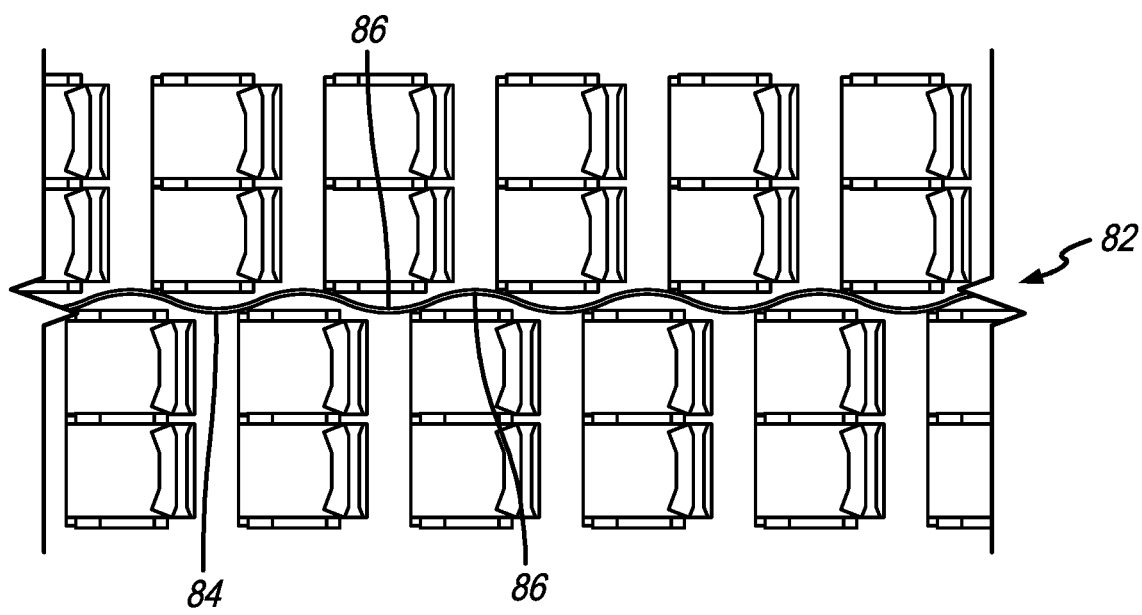
FIG. 13 is an elevational view of the partition system of FIG. 12.

FIGS. 12-15 show other embodiments of partition systems that divide the cabin into first and second cabin sections. FIGS. 12-13 show a partition system 82 with a divider wall 84 with a wavy shape. As shown in FIG. 13 when used with rows of seats that are offset longitudinally with respect to one another in the first and second cabin sections 12 and 14, the wavy shape provides alcoves or indentations 86 that provide extra room for the person seated in the seat closest to the wall 84. Also, as shown in FIG. 12, the wall 84 does not extend all the way to the ceiling. However, in another embodiment, the wall can extend all the way to the ceiling. It will be appreciated that partition system 82 can include separate partition members, a carriage assembly, attachment assemblies or any others of the features described above in the previous embodiments.

Figure 14:
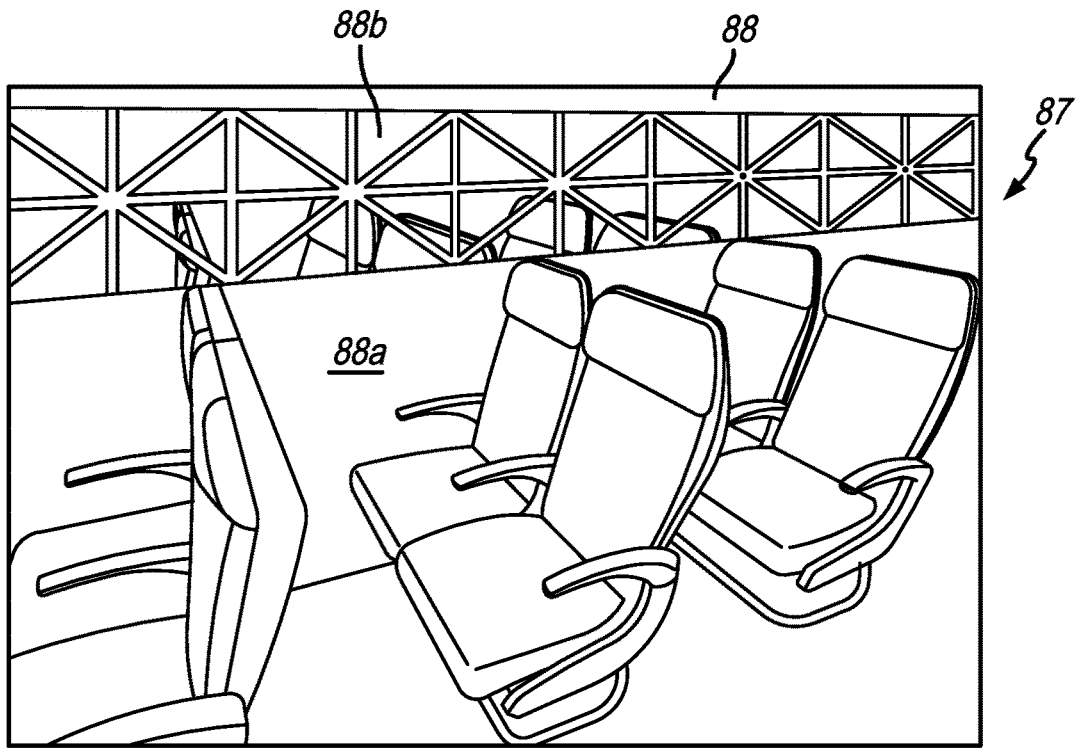
FIG. 14 is a perspective view of an embodiment of the partition system.

FIG. 14 shows a partition system 87 that includes a divider wall 88 having a solid or opaque lower section 88a and a non-opaque, transparent (a window or open space) or at least partially see-through upper section 88b. The upper section 88b allows passengers to see between cabin sections. It will be appreciated that partition system 87 can include separate partition members, a carriage assembly or any others of the features described above in the previous embodiments.

Figure 15:
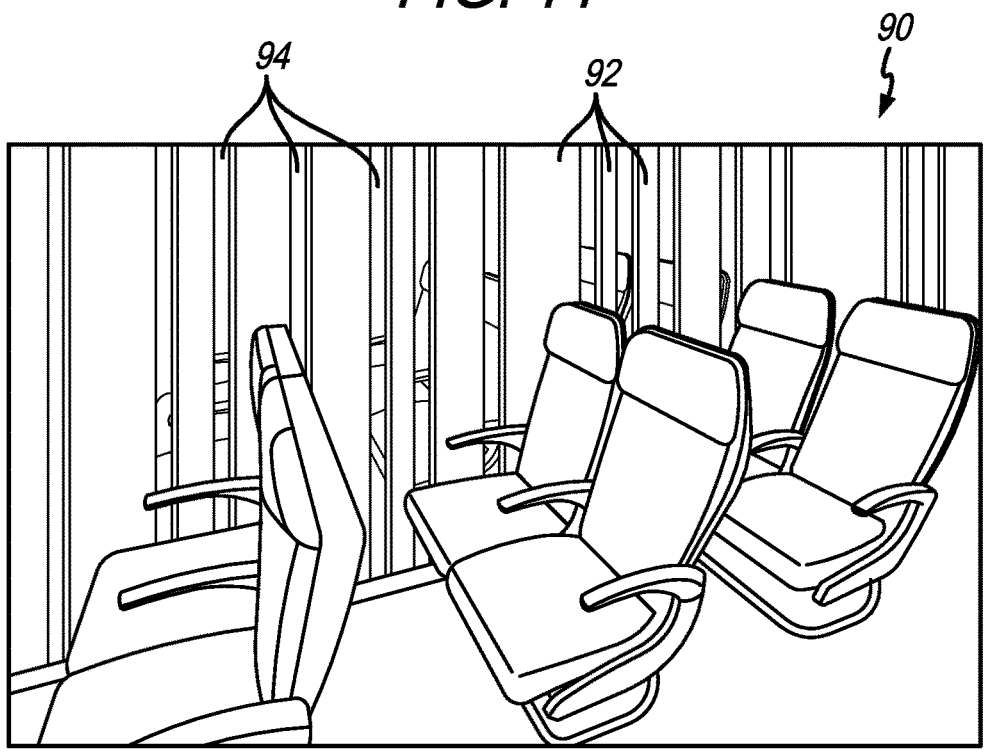
FIG. 15 is a perspective view of an embodiment of the partition system.

FIG. 15 shows a partition system 90 that includes divider walls 92 that define spaces 94 therebetween. The space is 94 allow passengers to see between cabin sections. Also, as shown, the divider walls 92 are angled with respect to or are not parallel to the longitudinal axis of the aircraft. In another embodiment the divider walls 92 can extend parallel to the longitudinal axis of the aircraft. It will be appreciated that partition system 90 can include separate partition members, a carriage assembly or any others of the features described above in the previous embodiments.

The particular arrangement shown in the figures and described herein is intended to be only exemplary of a partition system incorporating the principles of the invention. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft partition system comprising:
   a first partition assembly that includes an attachment assembly configured to be secured to a first seat track, and
   a divider wall having first and second opposing sides and extending upwardly from the attachment assembly, wherein the attachment assembly includes a first attachment member extending transversely away from the first side of the divider wall, wherein the first attachment member includes a first seat track fitting extending downwardly therefrom that is configured to be secured to a first seat track, wherein the attachment assembly includes a second attachment member extending transversely away from the second side of the divider wall and generally opposite from the first attachment member, and wherein the second attachment member includes a second seat track fitting extending downwardly therefrom that is configured to be secured to a second seat track.

2. The aircraft partition system of claim 1 wherein the first attachment member includes a flange secured to the first side of the divider wall, an arm extending outwardly from the flange and a seat track fitting extending downwardly from the arm, and wherein the second attachment member includes a flange secured to the second side of the divider wall, an arm extending outwardly from the flange and a seat track fitting extending downwardly from the arm.

3. The aircraft partition system of claim 1 wherein the attachment assembly includes a seat track member.

4. The aircraft partition system of claim 1 further comprising a carriage assembly, wherein the top of the divider wall of the first partition assembly is secured to the carriage assembly.

5. The aircraft partition system of claim 3 wherein the seat track member is located on the attachment assembly.

6. The aircraft partition system of claim 4 wherein the carriage assembly includes a first hook configured to be secured to a first passenger service unit rail.

7. The aircraft partition system of claim 4 wherein the divider wall of the first partition assembly is movable with respect to the carriage assembly.

8. The aircraft partition system of claim 7 wherein the carriage assembly includes a channel defined therein, wherein the divider wall includes a movable member at a top thereof, and wherein the movable member is received in the channel.

9. The aircraft partition system of claim 8 wherein the movable member is a pin extending upwardly from the top of the divider wall.

10. The aircraft partition system of claim 6 wherein the carriage assembly includes a second hook configured to be secured to a second passenger service unit rail.

11. The aircraft partition system of claim 1 further comprising a second partition assembly that includes an attachment assembly configured to be secured to a first seat track, and a divider wall extending upwardly from the attachment assembly and including first and second opposing sides.

12. The aircraft partition system of claim 11 wherein the partition system includes a carriage assembly, wherein the top of the divider wall of the first partition assembly is secured to the carriage assembly, and wherein the top of the divider wall of the second partition assembly is secured to the carriage assembly.

13. The aircraft partition system of claim 11 further comprising an electrical conduit member positioned between the divider walls of the first and second partition assemblies.

14. The aircraft partition system of claim 13 wherein the electrical conduit member includes a light.

15. The aircraft partition system of claim 1 wherein the first side of the divider wall includes at least a first component chosen from an armrest, a literature pocket, a pivotal tray, a cup holder, a reading light, a charging station, a wall pad or a pillow, and wherein the second side of the divider wall includes at least a second component chosen from an armrest, a literature pocket, a pivotal tray, a cup holder, a reading light, a charging station, a wall pad or a pillow.

16. The aircraft partition system of claim 15 wherein the first and second components are movable horizontally with respect to the divider wall.

17. The aircraft partition system of claim 1 wherein when the first and second seat track fittings are secured to the first and second seat tracks, the divider wall is configured to extend generally parallel to and between the first and second seat tracks.

18. An aircraft partition system comprising:
a first partition assembly that includes an attachment assembly, and a divider wall having first and second opposing sides and extending upwardly from the attachment assembly, wherein the attachment assembly includes a first attachment member extending transversely away from the first side of the divider wall, wherein the first attachment member includes a first seat track fitting extending downwardly therefrom that is configured to be secured to a first seat track, wherein the attachment assembly includes a second attachment member extending transversely away from the second side of the divider wall and generally opposite from the first attachment member, and wherein the second attachment member includes a second seat track fitting extending downwardly therefrom that is configured to be secured to a second seat track,
a second partition assembly that includes an attachment assembly, and a divider wall having first and second opposing sides and extending upwardly from the attachment assembly, wherein the attachment assembly includes a first attachment member extending transversely away from the first side of the divider wall, wherein the first attachment member includes a first seat track fitting extending downwardly therefrom that is configured to be secured to a first seat track, wherein the attachment assembly includes a second attachment member extending transversely away from the second side of the divider wall and generally opposite from the first attachment member, and wherein the second attachment member includes a second seat track fitting extending downwardly therefrom that is configured to be secured to a second seat track, and
a carriage assembly that includes a main body portion, wherein the main body portion includes first and second hooks that are configured to be secured to first and second passenger service unit rails in the aircraft, wherein the top of the divider wall of the first partition assembly is secured to the carriage assembly, and wherein the top of the divider wall of the second partition assembly is secured to the carriage assembly.

19. The aircraft partition system of claim 18 wherein the attachment assembly includes a seat track member.

20. The aircraft partition system of claim 18 wherein the divider walls of the first and second partition assemblies are movable with respect to the carriage assembly.

* * * * *